United States Patent [19]

Parker, Jr.

[11] 4,225,801
[45] Sep. 30, 1980

[54] ELECTROSTATIC MOTOR

[76] Inventor: Charles M. Parker, Jr., 40-29 205th St., Bayside, N.Y. 11361

[21] Appl. No.: 39,402

[22] Filed: May 15, 1979

[51] Int. Cl.² .............................................. H02N 1/00
[52] U.S. Cl. ..................................... 310/308; 310/309
[58] Field of Search ................. 310/308, 309; 318/116

[56] References Cited

U.S. PATENT DOCUMENTS

| | | | |
|---|---|---|---|
| 735,621 | 8/1863 | Thomson | 310/308 X |
| 1,974,483 | 9/1934 | Brown | 310/308 |
| 2,232,143 | 2/1941 | Schweitzer, Jr. | 310/308 |
| 3,414,742 | 12/1968 | Fisher et al. | 310/308 |
| 3,433,981 | 3/1969 | Bollee | 310/309 |
| 3,436,630 | 4/1969 | Bollee | 310/308 X |
| 3,517,225 | 6/1970 | Klein | 310/309 |
| 3,629,624 | 12/1971 | Staudte | 310/309 |

OTHER PUBLICATIONS

*Electrostatics and It's Applications,* Moore, John Wiley, N.Y., 1973, Chapter 7.

*Primary Examiner*—Donovan F. Duggan
*Attorney, Agent, or Firm*—Norman B. Rainer

[57] ABSTRACT

A motor is provided which produces rotative force in response to electrostatic energization. The motor is comprised of a cylindrical outer stator, a cylindrical internal stator, and a rotor mounted on a drive shaft coaxially positioned with respect to said stators. The rotor supports at least two drive assemblies adapted to revolve about said internal stator, each drive assembly comprised of two longitudinal halves of cylindric surfaces coextensive with said drive shaft in opposed disposition about an intervening mass of dielectric material. The stators and half cylindric surfaces are comprised of electrically conductive material. The rotor is caused to rotate when both stators are provided with an electrical charge of the same polarity and the half cylindric surfaces of a given drive assembly are oppositely charged.

5 Claims, 4 Drawing Figures

ELECTROSTATIC MOTOR

BACKGROUND OF THE INVENTION

This invention relates to improvements in motors utilizing an electrostatic principle of operation, and more particularly to motors of such nature having improved efficiency of operation.

It is well known that motors can be designed which produce rotary motion in response to electrostatic forces. In such motors, surfaces of electrically conductive and insulative material are generally arranged in a manner such that electrical charges of a desired polarity can be controllably maintained in desired positions. Rotative movement of one member of the motor, called the rotor, with respect to a stationary member called a stator is generally achieved by the additive effects of the repulsion of closely adjacent surfaces of like charge and the attraction of closely adjacent surfaces of opposite charge. A review of this field of art may be found in the book "Electrostatic Motors, Their History, Types, and Principles of Operation" by O. D. Jefimenko, Electret Scientific, 1972.

An electrostatic motor is disclosed in U.S. Pat. No. 1,974,483 to T. T. Brown wherein angularly shaped bodies carrying separated charges are caused to interact with a closely spaced singularly charged surface. Although various physical embodiments of the Brown motor are possible, greater efficiency is desirable, particularly in embodiments wherein the stator is in the form of a cylindrical shell which surrounds the rotor.

Accordingly, it is an object of the present invention to provide an electrostatic motor of improved efficiency of operation.

It is another object of this invention to provide a motor of the aforementioned nature having a rotor member protectively enclosed within a cylindrical stator member.

These objects and other objects and advantages of the invention will be apparent from the following description.

SUMMARY OF THE INVENTION

The above and other beneficial objects and advantages are accomplished in accordance with the present invention by the provision of an improved electrostatic motor comprising a cylindrical stator which surrounds a rotor adapted to revolve about the axis of said outer stator, and a cylindrical internal stator concentric with said outer stator. The outer stator is comprised of a cylindrically shaped electrical conductor, the outer surface of which supports a layer of dielectric material which holds a number of cylindrical tubes in a parallel array coextensive with said axis.

The internal stator comprises a cylindrically shaped electrical conductor having a diameter between about 0.2 and 0.4 times the diameter of said outer stator and mounted coaxially therewith.

The rotor comprises rotative support means fabricated of a dielectric material fixedly mounted upon a drive shaft coaxially disposed with respect to said internal and outer stators. Drive assemblies are fixedly held by said rotative support means adjacent the extremities thereof remote from said drive shaft. Each drive assembly is comprised of two longitudinal halves of cylindric surfaces of conductive material in opposed disposition about an intervening mass of dielectric material associated with said rotative support means. The dimensions of the several components of the motor are such that the drive assemblies fit as closely as possible between said internal and outer stators while permitting freedom of rotation.

Electrically conductive wiring is provided in a manner to facilitate operation of the motor by connections to a source of direct electrical current or to an electrostatic potential gradient. The wiring is such as to cause the cylindrical tubes of the outer stator, and the internal stator to possess the same polarity charge. By means of brush-type contacts, electrical charge is directed to the drive assembles in a manner such that the opposed half cylindric surfaces possess opposite charges, and the relative charge disposition is the same on the next adjacent drive assembly such that, in circular sequence about the drive shaft, the half cylindric surfaces alternatingly possess positive and negative charges.

BRIEF DESCRIPTION OF THE DRAWINGS

For a fuller understanding of the nature and objects of the invention, reference should be had to the following detailed description taken in connection with the accompanying drawing forming a part of this specification and in which like numerals of reference indicate like parts in all the figures of the drawing.

DESCRIPTION OF THE PREFERRED EMBODIMENT

Figure 1:
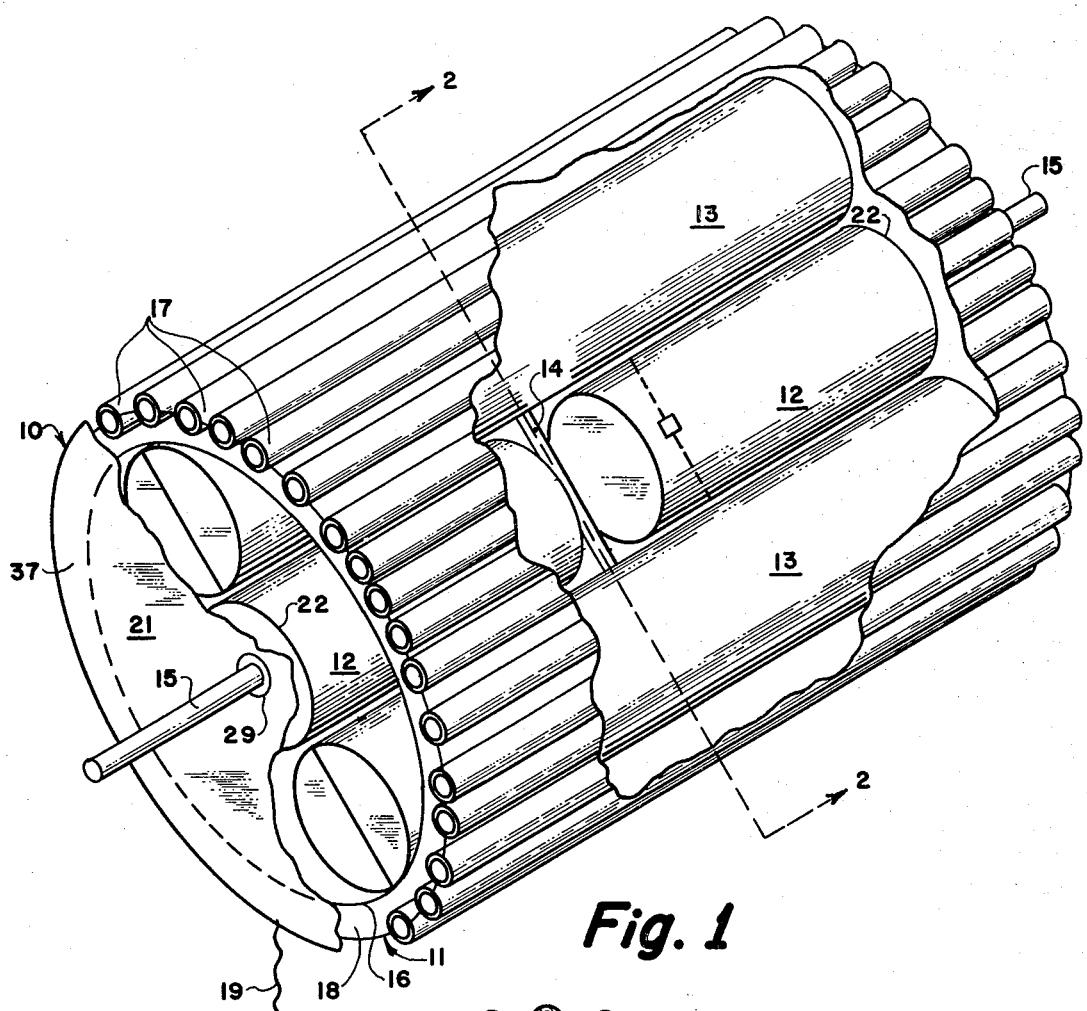
FIG. 1 is a perspective view of an embodiment of electrostatic motor of the present invention with parts broken away to reveal interior details.

Referring to FIG. 1, an electrostatic motor 10 of this invention is shown comprised of outer stator 11, internal stator 12, and opposed drive assemblies 13 attached to rotative support means such as rotor arm 14 which engages drive shaft 15. Said outer stator is comprised of outside cylinder 16 fabricated of electrically conductive material, cylindrical tubes 17 fabricated of electrically conductive material, and dielectric material 18 which serves to position tubes 17 in parallel array and uniformly spaced circumferentially and radially with respect to outside cylinder 16. Stationary end support means embodied as closure plates 21, preferably fabricated of non-conductive material, position drive shaft 15 and internal stator 12.

Electrical interconnecting means such as circumscribing conductive layer 37 on the inner face of one of the closure plates 21 is employed to electrically unite tubes 17. Conductive layer 37 is in turn electrically connected by lead wire 19 to a source of direct current or electrostatic force of a given polarity. When tubes 17 are electrically energized by a suitable source of direct current or electrostatic force, they produce a high intensity charge field, causing inductive development of a strong charge of same polarity on the inside surface of outside cylinder 16 insulatively displaced from said tubes. Outside cylinder 16 may additionally be directly connected to the same polarity charge applied to tubes 17.

The internal stator 12 is comprised of two identical electrically conductive segments 20, each held stationary by attachment at their exterior extremities 22 to dielectric closure plates 21 positioned at each end of the motor. The facing inner extremities 23 of segments 20 are supported by insulative spacers 24 journaled to shaft 15. An electrical source is connected to each segment 20 by means of electrical conductors in a manner such that both segments 20 are provided with a charge of the same polarity, said polarity being the same as that applied to tubes 17.

Figure 2:
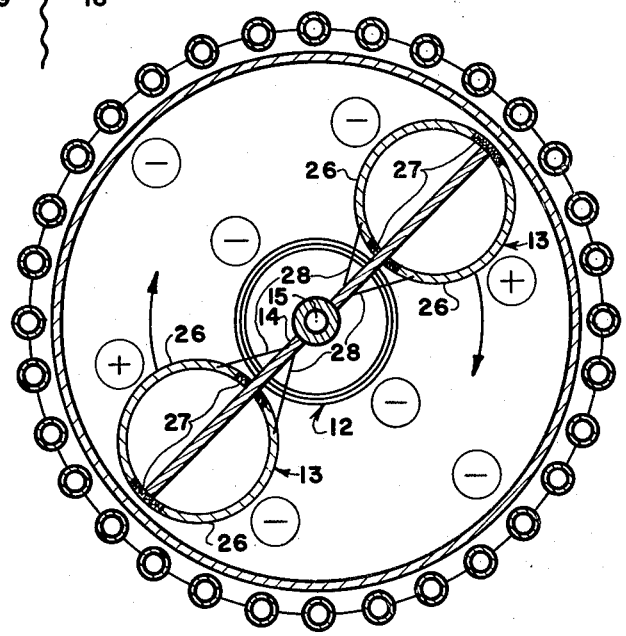
FIG. 2 is a transverse sectional taken along the line 2—2 of FIG. 1.

Referring to FIG. 2, each drive assembly 13 is shown comprised of facing half cylinders 26 separated by longitudinally extending insulative separators 27 attached to rotor arm 14. Each half cylinder has a trough-like configuration having two opposed parallel straight edges. The facing relationship of the half cylinders is such that the combined structure of the two half cylinders and intervening insulative material is that of a cylinder. Electrical charges are applied to said half cylinders by conductive pathways adjacent or associated with rotor arm 14, as exemplified by wires 28 emanating from drive shaft 15. Said half cylinders are charged in a manner such that the facing half cylinders of a given driven assembly possess opposite polarity, and the polarities of the half cylinders of the diametrically opposed drive assembly are reversed about the axis of the rotor arm. In this manner, the half cylinders are of alternating polarity with respect to their rotative path of motion, as shown in FIG. 2.

Because of their opposite polarities, and close proximity to the outer and internal stator surfaces, an attractive force is produced between said stator surfaces and the half cylinder having a polarity opposite thereto, and a repulsive force is produced between said stator surfaces and the half cylinder having the same polarity. Because the directions of the attractive and repulsive forces are the same with respect to both illustrated drive assemblies, their concerted effect is to cause rotation of drive shaft 15. In the specific embodiment exemplified in FIG. 2, wherein outside cylinder 16 and internal stator 12 have a negative polarity, rotation of rotor arm 14 and attached drive shaft 15 is in the clockwise direction. If the sequence of polarities of said half cylinders 26 were reversed, the direction of motion of drive shaft 15 would be reversed.

Figure 3:
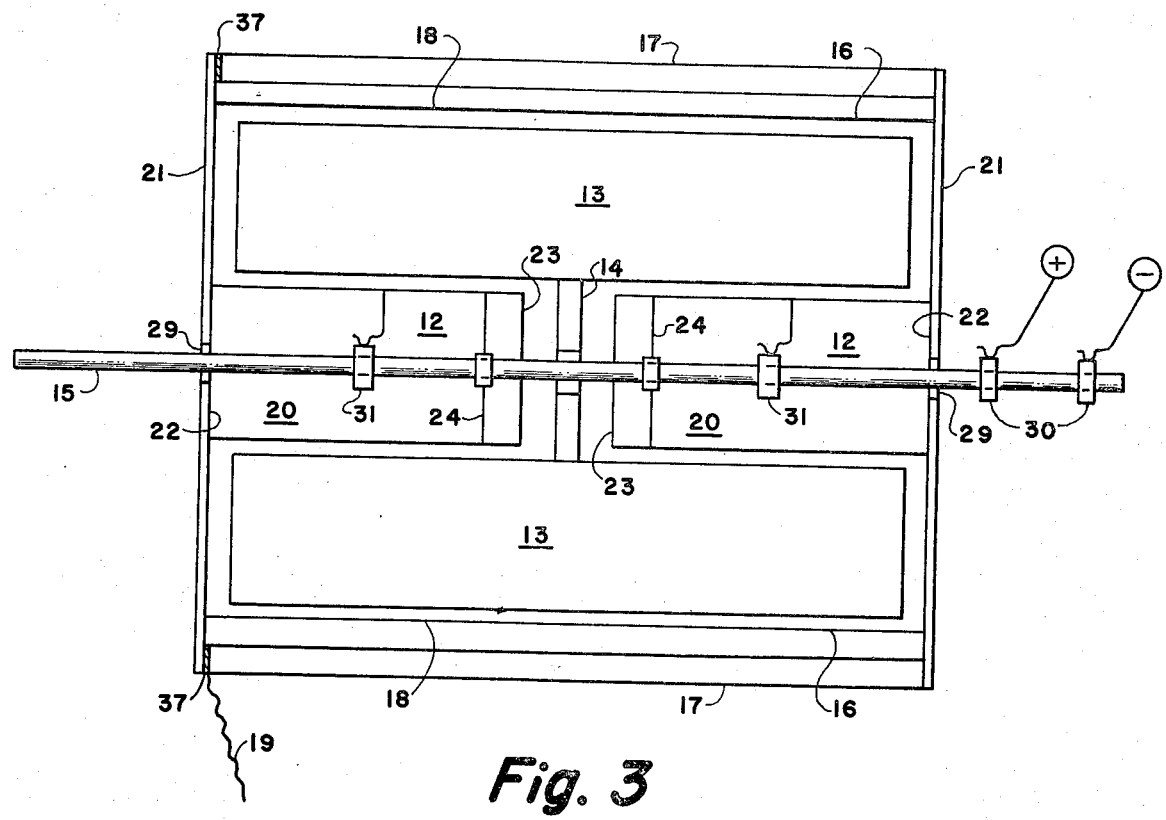
FIG. 3 is a sectional view of the motor of FIG. 1 taken in the vertical plane including the longitudinal axis.

Referring to FIG. 3, drive shaft 15 is shown extending through the motor as the longitudinal axis thereof, and supported by journal bearings 29 centered in closure plates 21. The portions of drive shaft 15 extending beyond the confines of the motor may be adapted to engage with conventional power transmitting components such as gears, pulleys and the like. Said drive shaft is preferably constructed in a manner such that electrically conductive paths are contained therein. Such paths may for examble be in the form of conductive wires positioned within a hollow core running the axis of said shaft, or conductive strips recessed into the outer periphery of the shaft, or coextending annular conductors alternating with annular non-conductors in a composite shaft structure, or still other equivalent configurations.

The primary purpose of said conductive paths is to electrically energize drive assemblies 13. Since the drive shaft 15 and rotor arm 14 are associated in immobile relationship, fixed conductive means 28 shown in FIG. 2 may be utilized to conduct electrical charge from drive shaft 15 to the several half cylinders 26. Conduction of electrical charge from an appropriate source into drive shaft 15 and its associated conductive paths may be accomplished by means of brush contact rings 30 mounted on said drive shaft beyond the outside face of closure plate 21. In similar manner, the stationary segments 20 of internal stator 12 may be supplied with electrical charge by brush contact with rings 31. Said stationary segments may however be energized by suitable electrical connections independent of shaft 15 and made directly through closure plates 21 or means associated therewith.

It has been found that, in order to prevent electrical interaction between drive assemblies 13, the diameter of internal stator 12 should preferably be larger than the diameter of said drive assemblies. In general, the lengths of the internal stator, outer stator, and drive assemblies will be approximately equal.

Dielectric materials which may be utilized in the fabrication of those components of the motor intended to have insulative properties include wood, rubbers, plastics and other structurally useful materials having a dielectric constant k of less than 4.5, said dielectric constant k being a dimensionless constant as part of the formula:

$$F = Q_1 Q_2 / K r^2$$

wherein F is the force between two charges of magnitudes $Q_1$ and $Q_2$ separated by a distance r. As is seen from the equation, the smaller the value of k, the larger will be the force F developed between the separated charges. When the charges are separated by a perfect vacuum, $k = 1.0$.

Although the motor of this invention has been illustrated having two drive assemblies mounted at opposed ends of a rotor arm, more than two drive assemblies may be utilized in equiangular disposition about suitable rotative support means in a centrifugally balanced configuration.

Figure 4:
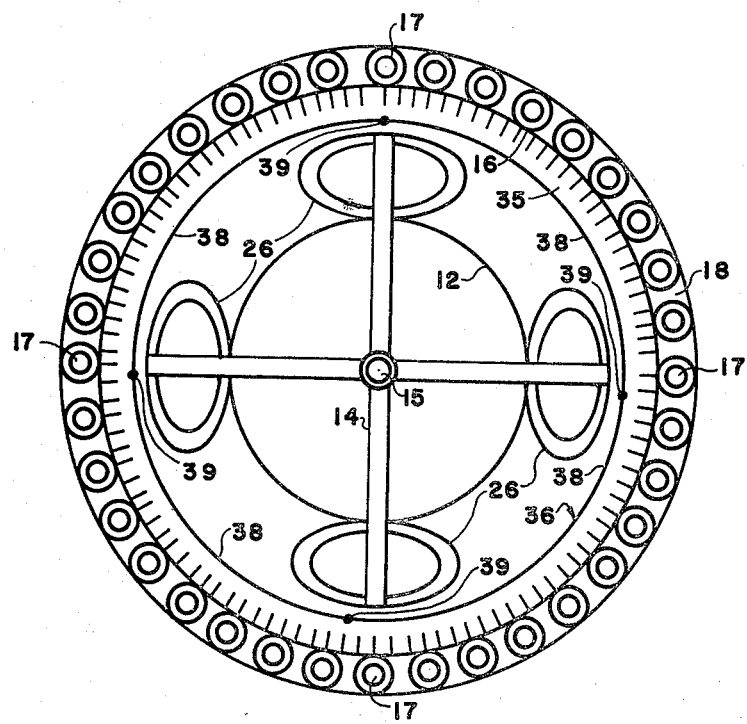
FIG. 4 is a transverse sectional view of another embodiment of the motor of this invention.

The half cylinders 26, although being portions of a cylindric surface and shown in FIGS. 1 and 2 to have circular cross-sectional curvature, may have non-circular curvature, as shown in the embodiment of FIG. 4. The half cylinders will in general however, have identical curved cross sectional configurations having a line of symmetry perpendicular to rotative support means 14. The convex portion of each half cylinder is directed away from said rotative support means.

The outer stator may incorporate additional features to supplement outside cylinder 16. As shown in FIG. 4, outside cylinder 16 is provided with a brush-like inner lining 35 which transfers electrical charge along radially directed bristles to receiver ring 36 comprised of conductive arcuate segments 38 and elongated insulative spacers 39 coextensively aligned with shaft 15. This combined effect creates greater charge build-up on receiver ring 36 for interaction with the drive assemblies 13.

The motor of the present invention is particularly useful in instrument and control applications where reliability of performance and low heat generation are factors of paramount importance. The motor may further be modified to generate electrical current by providing permanent magnets in association with rotative support means 14 disposed in close proximity to coils of conductor wire which cut through the magnetic flux field of said magnets. Still other applications and modifications of the motor may be contemplated within the purview of the present invention.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An electrostatic motor comprising:
   (a) an outer stator comprised of an electrically conductive cylindrical enclosure of circular cross section, dielectric material surrounding the exterior of said enclosure, a parallel array of electrically conductive cylindrical tubes coextensive with the longitudinal axis of said enclosure and positioned by said dielectric material uniformly about the periphery of said enclosure and spaced apart therefrom, said array of tubes being electrically interconnected so that all the tubes can be made to possess a charge of the same polarity,
   (b) stationary support means engaging said outer stator at each extremity thereof and disposed in a manner substantially perpendicular to said axis,
   (c) an internal stator comprised of two identical circular cylindrical segments of electrically conductive material sequentially positioned coaxially with respect to said outer stator and substantially within the confines thereof, the exterior extremities of said segments being supported by attachment to said stationary support means, and means adapted to convey an electric charge of same polarity to said segments,
   (d) a drive shaft coaxially positioned with respect to said internal and outer stators, supported for rotative movement by said stationary support means, and having electrically conductive paths associated therewith, and
   (e) a rotor member adapted to revolve about said longitudinal axis comprising rotative support means centrally attached to said drive shaft and extending perpendicularly therefrom at a site between the cylindrical segments of said internal stator, at least two drive assemblies held by said rotative support means at equiangular dispositions about said axis, each drive assembly comprising two facing half cylinders coextensive with said drive shaft, fabricated of electrically conductive material and separated therebetween by insulative material extending perpendicularly from said rotative support means and substantially coplanar with said longitudinal axis, and means associated with said rotative support means to supply electrical charge of opposite polarities to the half cylinders of a given drive assembly, the polarities of charges on the half cylinders of one drive assembly with respect to the next adjacent drive assembly being such that alternating positive and negative charges are provided sequentially in a circular locus about said longitudinal axis, whereby rotational movement is imparted to said rotor member when electrical charges of the same polarity are applied to said internal stator and outer stator.

2. The electrostatic motor of claim 1 wherein said half cylinders are identical, the transverse cross-sectional configuration of which possesses a line of symmetry.

3. The electrostatic motor of claim 2 wherein said half cylinders are arranged in a manner such that a cylindrical structure is formed and said lines of symmetry are perpendicular to said rotative support means.

4. The electrostatic motor of claim 1 wherein the diameter of said internal stator is greater than the diameter of said drive assemblies.

5. The electrostatic motor of claim 1 wherein said outer stator is provided with a brush-like inner lining which transfers electrical charge along radially directed conductive bristles to a receiver ring comprised of conductive arcuate segments and elongated insulative spacers coextensively aligned with said shaft.

* * * * *